(12) United States Patent
Anttila et al.

(10) Patent No.: US 11,049,306 B2
(45) Date of Patent: Jun. 29, 2021

(54) DISPLAY APPARATUS AND METHOD FOR GENERATING AND RENDERING COMPOSITE IMAGES

(71) Applicant: Varjo Technologies Oy, Helsinki (FI)

(72) Inventors: Akseli Anttila, Helsinki (FI); Kaj Harri Wikberg, Helsinki (FI); Jaakko Viitanen, Espoo (FI); Ari Antti Peuhkurinen, Helsinki (FI); Aleksei Romanov, Vantaa (FI); Iurii Popov, Helsinki (FI); Tomi Lehto, Helsinki (FI); Evgeny Zuev, Helsinki (FI)

(73) Assignee: Vago Technologies Oy, Helsinki (FI)

( * ) Notice: Subject to any disclaimer, the term of this patent is extended or adjusted under 35 U.S.C. 154(b) by 0 days.

(21) Appl. No.: 16/675,447

(22) Filed: Nov. 6, 2019

(65) Prior Publication Data

US 2021/0134033 A1    May 6, 2021

(51) Int. Cl.
*G06T 7/70*   (2017.01)
*G06T 11/60*  (2006.01)
(Continued)

(52) U.S. Cl.
CPC .............. *G06T 11/60* (2013.01); *G06F 3/012* (2013.01); *G06F 3/013* (2013.01); *G06F 3/017* (2013.01); *G06F 3/167* (2013.01); *G06K 9/00201* (2013.01); *G06T 7/70* (2017.01); *G06T 2207/20132* (2013.01); *G06T 2207/20221* (2013.01)

(58) Field of Classification Search
CPC ..... G06K 9/00201; G06F 3/012; G06F 3/013; G06F 3/017; G06F 3/167; G06T 7/70; G06T 11/60; G06T 19/006; G06T 2207/20132; G06T 2207/20221
USPC ......................................................... 345/633
See application file for complete search history.

(56) References Cited

U.S. PATENT DOCUMENTS

2014/0063060 A1* 3/2014 Maciocci .............. G06T 19/006
                                                                345/633
2014/0364212 A1   12/2014 Osman et al.
(Continued)

OTHER PUBLICATIONS

Patent Cooperation Treaty, International Searching Authority, Partial International Search and Provisional Opinion, Application No. PCT/FI2020/050696, dated Jan. 29, 2021, 15 pages.

*Primary Examiner* — Jacinta M Crawford
(74) *Attorney, Agent, or Firm* — Ziegler IP Law Group, LLC

(57) ABSTRACT

A display apparatus including image renderer, camera and processor. The processor or external processor communicably coupled to said processor is configured to: render at least one extended-reality image during first mode of operation of display apparatus; determine second mode of operation to which display apparatus is to be switched; control camera to capture at least one real-world image of real-world environment; generate at least one composite image from at least one next extended-reality image and at least one real-world image, wherein first portion of at least one composite image is derived from at least one next extended-reality image, and second portion of at least one composite image is derived from at least one real-world image; and render at least one composite image during second mode of operation of display apparatus.

20 Claims, 6 Drawing Sheets

(51) Int. Cl.
*G06F 3/01* (2006.01)
*G06F 3/16* (2006.01)
*G06K 9/00* (2006.01)

(56) References Cited

U.S. PATENT DOCUMENTS

| | | | |
|---|---|---|---|
| 2016/0314624 A1* | 10/2016 | Li | G06F 3/0482 |
| 2018/0004286 A1* | 1/2018 | Chen | G06T 11/60 |
| 2018/0039079 A1 | 2/2018 | Lin et al. | |
| 2018/0095542 A1 | 4/2018 | Mallinson | |

* cited by examiner

DISPLAY APPARATUS AND METHOD FOR GENERATING AND RENDERING COMPOSITE IMAGES

TECHNICAL FIELD

The present disclosure relates generally to display apparatuses; and more specifically, to display apparatuses comprising image renderers, cameras and processors. Moreover, the present disclosure also relates to methods related to the aforesaid display apparatuses.

BACKGROUND

In the past few decades, modern technologies such as virtual reality, augmented reality, mixed reality, and the like, have made exponential advancement in the way such technologies represent extended-reality environments to users of specialized devices. Specifically, such extended-reality environments relate to fully virtual environments (namely, virtual reality environments) as well as real-world environments having virtual objects therein (namely, augmented reality environments, mixed-reality environments). Presently, the extended-reality environments are experienced by users using dedicated extended-reality devices such as virtual-reality headsets, augmented-reality headsets, mixed-reality headsets, and the like.

Typically, an extended-reality device is capable of presenting only its corresponding extended-reality environment. For example, virtual-reality devices present virtual-reality environments, mixed-reality devices present mixed-reality environments, and so on. Existing extended-reality devices are limited in their ability to present different types of extended-reality environments to a user. Firstly, the existing extended-reality devices are not user-friendly as the user is required to remove said devices to switch between different modes of operation (of said devices). Secondly, even when the extended-reality devices are being operated in a single mode, the user is required to remove said devices to install or access multiple extended-reality applications of the single mode at the extended-reality devices. Thirdly, the existing extended-reality devices lack provision for presenting, while a given extended-reality environment is being rendered, a real-world environment where the user is currently present. The user is required to take off the extended-reality to view the real-world environment.

Therefore, in light of the foregoing discussion, there exists a need to overcome the aforementioned drawbacks associated with existing extended-reality devices.

SUMMARY

The present disclosure seeks to provide a display apparatus. The present disclosure also seeks to provide a method. The present disclosure seeks to provide a solution to the existing problem of requiring users of existing extended-reality devices to remove said devices for viewing different extended-reality environments and a real-world environment. An aim of the present disclosure is to provide a solution that overcomes at least partially the problems encountered in prior art, and provides a user-friendly display apparatus that can be switched to operate in different modes of operation without being removed by the user.

In one aspect, an embodiment of the present disclosure provides a display apparatus comprising at least one image renderer, at least one camera and a processor, wherein the processor or at least one external processor communicably coupled to said processor is configured to:

render, via the at least one image renderer, at least one extended-reality image during a first mode of operation of the display apparatus;

determine, based on a user's input, a second mode of operation to which the display apparatus is to be switched;

control the at least one camera to capture at least one real-world image of a real-world environment;

generate at least one composite image from at least one next extended-reality image and the at least one real-world image, wherein a first portion of the at least one composite image is derived from the at least one next extended-reality image, and a second portion of the at least one composite image is derived from the at least one real-world image; and render, via the at least one image renderer, the at least one composite image during the second mode of operation of the display apparatus.

In another aspect, an embodiment of the present disclosure provides a method comprising:

rendering, via at least one image renderer, at least one extended-reality image during a first mode of operation of a display apparatus;

determining, based on a user's input, a second mode of operation to which the display apparatus is to be switched;

capturing, via at least one camera, at least one real-world image of a real-world environment;

generating at least one composite image from at least one next extended-reality image and the at least one real-world image, wherein a first portion of the at least one composite image is derived from the at least one next extended-reality image, and a second portion of the at least one composite image is derived from the at least one real-world image; and rendering, via the at least one image renderer, the at least one composite image during the second mode of operation of the display apparatus.

Embodiments of the present disclosure substantially eliminate or at least partially address the aforementioned problems in the prior art, and enable a user to view different immersive-reality environments using the display apparatus in a convenient manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3B illustrates a real-world image of a real-world environment, while

FIG. 4E illustrates a mixed-reality overlay view, while

Figure 1:
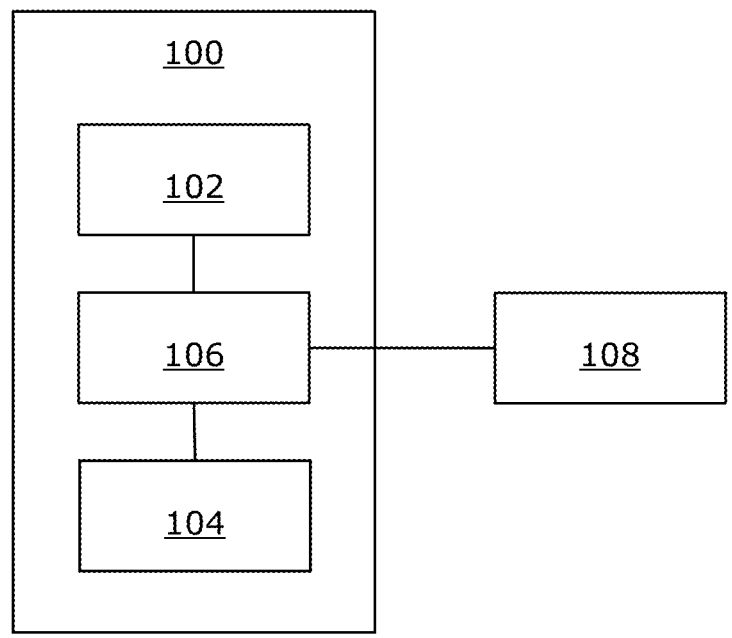
FIGS. 1 and 2 illustrate block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising at least one image renderer, at least one camera and a processor, wherein the processor or at least one external processor communicably coupled to said processor is configured to:

render, via the at least one image renderer, at least one extended-reality image during a first mode of operation of the display apparatus;

determine, based on a user's input, a second mode of operation to which the display apparatus is to be switched;

control the at least one camera to capture at least one real-world image of a real-world environment;

generate at least one composite image from at least one next extended-reality image and the at least one real-world image, wherein a first portion of the at least one composite image is derived from the at least one next extended-reality image, and a second portion of the at least one composite image is derived from the at least one real-world image; and render, via the at least one image renderer, the at least one composite image during the second mode of operation of the display apparatus.

In another aspect, an embodiment of the present disclosure provides a method comprising:

rendering, via at least one image renderer, at least one extended-reality image during a first mode of operation of a display apparatus;

determining, based on a user's input, a second mode of operation to which the display apparatus is to be switched;

capturing, via at least one camera, at least one real-world image of a real-world environment;

generating at least one composite image from at least one next extended-reality image and the at least one real-world image, wherein a first portion of the at least one composite image is derived from the at least one next extended-reality image, and a second portion of the at least one composite image is derived from the at least one real-world image; and rendering, via the at least one image renderer, the at least one composite image during the second mode of operation of the display apparatus.

The present disclosure provides the aforementioned display apparatus and the aforementioned method. The display apparatus is extremely user friendly and can be switched to operate in different modes of operation without being removed by the user. Beneficially, the display apparatus described herein allows the user to seamlessly view a portion of the real-world environment from his/her perspective whilst viewing an extended-reality environment. The display apparatus does not require any specialized complex equipment for the same. Furthermore, the at least one composite image provides the user with an immersive, realistic experience of reality whilst using the display apparatus. The method described herein is computationally efficient.

Throughout the present disclosure, the term "display apparatus" refers to a specialized equipment that is configured to present an immersive-reality environment to the user when the head-mounted display apparatus in operation is worn by the user on his/her head. In such an instance, the head-mounted display apparatus acts as a device (for example, such as a virtual reality headset, an augmented reality headset, a mixed reality headset, an immersive-reality headset, and the like) that is operable to present a visual scene of the immersive-reality environment to the user. Commonly, the term "display apparatus" is also referred to as "head-mounted display apparatus".

Herein, the term "immersive-reality" encompasses "extended-reality", "actual reality", as well as a combination of "extended-reality" and "actual reality".

Throughout the present disclosure, the term "image renderer" refers to equipment that, in operation, renders a given image that is to be displayed to the user of the display apparatus.

Optionally, the at least one image renderer is implemented as at least one display. Optionally, in this regard, the at least one display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one image renderer is implemented as at least one projector. In this regard, the given image is projected onto at least one projection screen or directly onto retinas of the user's eyes. Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Throughout the present disclosure, the term "camera" refers to equipment that is operable to detect and process light from the real-world environment, so as to capture image(s) of the real-world environment. Optionally, the at least one camera comprises a camera chip, wherein the light from the real-world environment is directed by at least one optical element onto a photosensitive surface of the camera chip, thereby enabling the at least one camera to capture said image(s). Herein, the term "at least one camera" refers to "one camera" in some implementations, and "a plurality of cameras" in other implementations.

It will be appreciated that the at least one camera could be a two-dimensional camera or a three-dimensional camera. The two-dimensional camera allows for capturing two-dimensional images of the real-world environment whereas the three-dimensional camera allows for capturing three-dimensional images of the real-world environment. Beneficially, such three-dimensional images provide depth information of the real-world environment. Examples of the at least one camera include, but are not limited to, a Red-Green-Blue (RGB) camera, a RGB-Depth (RGB-D) camera, a stereo camera, a plenoptic camera.

Throughout the present disclosure, the term "processor" refers to hardware, software, firmware or a combination of these. The processor controls overall operation of the display apparatus. In particular, the processor controls operation of the at least one image renderer and the at least one camera. It will be appreciated that the processor is coupled to various components (for example, such as the at least one image renderer, the at least one camera, and the like) of the display apparatus and optionally, controls operation of at least some of said components.

Throughout the present disclosure, the term "external processor" refers to a processor that is implemented as a processor of an external computing device. In such a case, the external computing device is communicably coupled to the display apparatus as the at least one external processor is communicably coupled to the processor. The at least one external processor is communicably coupled to the processor wirelessly and/or in a wired manner. It will be appreciated that performing, at the at least one external processor, at least some computational tasks associated with generation and rendering of the at least one composite image is beneficial, as it would considerably reduce processing burden on the processor of the display apparatus. It will be appreciated that the term "at least one external processor" refers to "one external processor" in some implementations, and "a plurality of external processors" in other implementations.

Optionally, the external computing device executes at least one software application that controls an operational behaviour of the display apparatus. Optionally, in this regard, the at least one software application creates a sequence of extended-reality images that are to be rendered at the display apparatus during the first mode of operation of the display apparatus.

During the first mode of operation, the at least one extended-reality image is rendered, via at least one image renderer. In such a case, the first mode of operation presents a visual scene of an extended-reality environment to the user. The visual scene of the extended-reality environment is realistic and immersive.

Throughout the present disclosure, the term "extended-reality" encompasses virtual reality, augmented reality, mixed reality, and the like.

In one embodiment, the at least one extended-reality image is at least one virtual-reality image. The at least one virtual-reality image, when rendered, presents a visual scene of a virtual reality environment to the user. In another embodiment, the at least one extended-reality image is at least one augmented-reality image. The at least one augmented-reality image, when rendered, presents a visual scene of an augmented reality environment to the user. In yet another embodiment, the at least one extended-reality image is at least one mixed-reality image. The at least one mixed-reality image, when rendered, presents a visual scene of a mixed reality environment to the user.

Optionally, the processor or the at least one external processor is configured to:
select, based on a user's input, a given view from amongst a plurality of views available during the first mode of operation; and
generate, based on the selected given view, the at least one extended-reality image to be rendered.

In this regard, the plurality of views available during the first mode of operation correspond to a plurality of extended-reality environments. The user provides his/her input to select the given view corresponding to a given extended-reality environment, based on his/her preference or requirement. Based on the user's selected given view, the at least one extended-reality image associated with the given extended-reality environment is generated. Likewise, the at least one next extended-reality image associated with the given extended-reality environment is also generated.

It will be appreciated that the first mode of operation and the given view to be shown therein are selected, based on the same user input. Moreover, Moreover, the user can access different views from amongst the plurality of views, via his/her input, without removing the display apparatus.

Optionally, the user's input is obtained as at least one of: a voice input, a touch input, a hand-gesture input, a head-gesture input, an eye-gesture input. Optionally, in this regard, the display apparatus further comprises at least one interaction device. Optionally, the user's input is obtained via the at least one interaction device. Optionally, the at least one interaction device is implemented as at least one input device that the user uses to provide his/her input and/or as at least one tracking device that is capable of tracking and detecting gestures made by the user. The at least one input device and/or the at least one tracking device enable the user to conveniently interact with the visual scene presented by the display apparatus.

Optionally, the processor or the at least one external processor is coupled in communication with the at least one input device and/or the at least one tracking device.

Optionally, the at least one input device is at least one of: a microphone, a keyboard, a keypad, a mouse, a six-degrees-of-freedom controller, a joystick, a hybrid input device, a touchpad, a button on the display apparatus.

Optionally, the at least one tracking device is at least one of: the at least one camera, a trackable wearable device, a means for tracking a head pose of the user, a means for tracking the gaze directions of the user's eyes.

In an example, the user may provide the voice input via two microphones arranged on the display apparatus.

In another example, the user may provide the touch input via a QWERTY keyboard kept on a surface in the real-world environment. The touch input may be provided by pressing a function key of the QWERTY keyboard, pressing at least two shortcut keys of the QWERTY keyboard, and the like. In yet another example, the user may provide the touch input via the hybrid input device (namely, a device that can be operated as the mouse and the six-degrees-of-freedom controller). When the hybrid input device is operated as the mouse, the touch input may be provided as a left-click of the mouse, a right-click of the mouse, scrolling a wheel of the mouse, and the like. In still another example, the user may provide the touch input via at least one button on the display apparatus. Optionally, there are defined a plurality of custom touch inputs which enable the user to switch between specific pairs of views when the display apparatus operates in the first mode of operation. A given custom touch input enables the user to quickly switch between different views in the first mode of operation. In such a case, when the user provides a touch input that does not belong to the plurality of custom touch inputs, the processor or the at least one external processor displays, via the at least one image renderer, an error message to the user. Moreover, optionally, the user enables or disables the plurality of custom touch inputs using a software application of a manufacturer of the display apparatus.

In yet another example, the user may provide the hand-gesture input by moving his/her hand(s) whilst using the display apparatus. The hand-gesture input is optionally detected by processing the at least one real-world image captured by the at least one camera or by tracking a motion of the trackable wearable device (for example, such as gloves, wristbands, finger caps) worn by the user on his/her hand(s) whilst using the display apparatus.

In still another example, the user may provide the head-gesture input by moving his/her head whilst using the display apparatus. The head-gesture input is optionally detected using the means for tracking the head pose of the user, wherein said means is arranged on the display apparatus and/or in the real-world environment. Herein, the term "pose" encompasses both "position" and "orientation". The means for tracking the head pose of the user is implemented as an Inertial Measurement Unit (IMU), a timing and inertial measurement unit, a detector for detecting at least one detectable object that is arranged in the real-world environment, and the like. Such means for tracking the head pose of the user are well-known in the art. In an example implementation of the display apparatus, when the means for tracking the head pose of the user detects that the user's head is oriented downwards for a first time period that is greater than a first predefined time period, the display apparatus is automatically switched from the first mode of operation to the second mode of operation. In such an implementation, when the means for tracking the head pose of the user detects that the user's head is oriented upwards for a second time period that is greater than a second predefined time period, the display apparatus is automatically switched from the second mode of operation to the first mode of operation. Optionally, when the second predefined time period is greater than the first predefined time period, there is implemented hysteresis in switching logic (of the processor or the at least one external processor) that causes switching between the first and second modes of operation.

In yet another example, the user may provide the eye-gesture input by changing gaze directions of his/her eyes whilst using the display apparatus. The eye-gesture input is optionally detected using the means for tracking the gaze directions of the user's eyes, wherein said means is arranged on the display apparatus. The means for tracking the gaze directions of the user's eyes is implemented as contact lenses with sensors, cameras monitoring the position of the pupil of the user's eye, and the like. Such means for tracking the gaze directions of the user's eyes (commonly referred to as an "eye tracker", a "gaze-tracking unit", and the like) are well-known in the art. In an example implementation of the display apparatus, when the means for tracking the gaze directions of the user's eyes detects that the user's eyes gaze downwards for a first time period that is greater than a first predefined time period, the display apparatus is automatically switched from the first mode of operation to the second mode of operation. In such an implementation, when the means for tracking the gaze directions of the user's eyes detects that the user's eyes gaze upwards for a second time period that is greater than a second predefined time period, the display apparatus is automatically from the second mode of operation to the first mode of operation. Optionally, when the second predefined time period is greater than the first predefined time period, there is implemented hysteresis in switching logic (of the processor or the at least one external processor) that causes switching between the first and second modes of operation.

Optionally, the plurality of views comprise at least two of:
a virtual-reality desktop view in which a virtual desktop is surrounded by a virtual environment,
a virtual-reality application view in which a virtual environment is created by a software application,
a virtual-reality overlay view in which the virtual desktop is overlaid on the virtual environment created by the software application,
a mixed-reality view in which at least one virtual object is overlaid on the real-world environment,
a mixed-reality overlay view in which the virtual desktop is overlaid on the mixed-reality view,
a settings overlay view in which a visual control panel is overlaid on any of: the virtual-reality desktop view, the virtual-reality application view, the virtual-reality overlay view, the mixed-reality view, or the mixed-reality overlay view.

It will be appreciated that the virtual-reality desktop view, the virtual-reality application view, and the virtual-reality overlay view correspond to virtual-reality environments; the mixed-reality view and the mixed-reality overlay view correspond to mixed-reality environments; and the settings overlay view correspond to either a virtual-reality environment, an augmented-reality environment, or a mixed-reality environment. It will also be appreciated that the display apparatus is capable of showing the plurality of views to the user, wherein the user can use various types of input types to easily switch between the plurality of views.

Optionally, in the virtual-reality desktop view, the virtual desktop is surrounded by the virtual environment. Herein, the term "virtual desktop" refers to a virtual (namely, computer-generated) representation of a desktop of a given computing device. The virtual desktop represents an exact number of desktop elements in an exact same arrangement as the desktop of the given computing device. Optionally, a position of the virtual desktop in the virtual-reality desktop view corresponds to an expected position of a physical display of the given computing device. More optionally, the virtual desktop is positioned in a central portion of the virtual-reality desktop view. Optionally, the user adjusts the position of the virtual desktop in the virtual-reality desktop view using the settings overlay view or the software application of the manufacturer of the display apparatus. Notably, the virtual environment that surrounds the virtual desktop acts as a virtual background for the virtual desktop. The virtual environment may be a virtual representation of a real environment, a virtual texture, and the like. It will be appreciated that in the virtual-reality desktop view, a complete functionality of desktop of the given computing device is available to the user, for his/her use.

Optionally, the virtual desktop is a virtual representation of a view that is being rendered contemporaneously at a display of an external computing device, wherein the external computing device comprises the at least one external processor, and wherein the software application is executed by the at least one external processor. In this regard, the user can see the view that is being rendered contemporaneously at the display of the external computing device while using the display apparatus. The user need not take off the display apparatus for viewing said view. Moreover, the virtual desktop shown at the display apparatus is an exact copy of said view. Examples of the external computing device include, but are not limited to, a desktop computer, a laptop computer, a tablet computer, a personal digital assistant, a console, and a smartphone.

Optionally, in the virtual-reality application view, the virtual environment is created by the software application. Optionally, the virtual environment represents at least one virtual object. The virtual environment is realistic and provides an immersive viewing experience to the user. The virtual environment may, for example, be a virtual-reality three-dimensional modeling application, a virtual-reality simulation software, a virtual-reality game, a virtual-reality tutorial, a virtual-reality movie, and the like.

Optionally, in the virtual-reality overlay view, the virtual desktop is overlaid on the virtual environment created by the software application in a manner that the user views both the virtual desktop, as well as the virtual environment. Optionally, in such a case, the user uses the virtual desktop to work with a traditional software application and uses the virtual environment to view a virtual representation of said work.

Optionally, in the mixed-reality view, the at least one virtual object is overlaid on the real-world environment. The user is provided with a video see-through view of the real-world environment and the at least one virtual object is digitally overlaid on top of the video see-through view.

Optionally, in the mixed-reality overlay view, the virtual desktop is overlaid on the mixed-reality view in manner that the views both the virtual desktop, as well as the real-world environment. In this case, the virtual desktop is a virtual object that is digitally overlaid on top of a video see-through view of the real-world environment.

Optionally, in the settings overlay view, the visual control panel is overlaid on any of the aforesaid views among the plurality of views. The user uses the visual control panel to adjust at least one system parameter of the display apparatus. The at least one system parameter includes, but is not limited to, a brightness of the at least one image renderer; an arrangement of the first and second portions of the at least one composite image; a volume of the display apparatus; and the position of the virtual desktop in the virtual-reality desktop view, the virtual-reality overlay view, or the mixed-reality overlay view. Optionally, the user selects the settings overlay view by providing a touch input of pressing a dedicated system button on the display apparatus.

Optionally, any view among the plurality of views is selected as a default view to be shown to the user when the display apparatus is switched on by the user. In such a case, the display apparatus is optionally switched on to operate in the first mode of operation, by default. Alternatively, optionally, a view of a given virtual environment is selected as a default view to be shown to the user when the display apparatus is switched on by the user. The given virtual environment may be, for example, a virtual room, a virtual nature environment, a virtual synthetic architectural environment, and the like. In an embodiment, the default view is selected by the user, using the system settings overlay view. In another embodiment, the default view is selected by the user, using the software application of the manufacturer of the display apparatus. In yet another embodiment, the default view is pre-set by a manufacturer of the display apparatus. Moreover, the default view can be static or dynamic. Optionally, at least one visual parameter of the default view is adjusted according to at least one of: time of the day, ambient lighting in the real-world environment.

Optionally, the processor or the at least one external processor is configured to enable or disable the at least one interaction device based on a current mode of operation of the display apparatus. Furthermore, optionally, the processor or the at least one external processor is configured to enable or disable the at least one interaction device, based on the selected given view. As an example, when the display apparatus is operating in the first mode of operation and the user selects the virtual-reality desktop view, input devices such as the keyboard, the mouse, the touchpad, and the hybrid input device may be enabled. In the virtual-reality desktop view, the aforesaid input devices allow the user to efficiently use the virtual desktop by enabling precise user control of a pointer and/or a cursor. Furthermore, whilst the virtual-reality desktop view is selected, input devices such as the six-degrees-of-freedom controller and the joystick may be disabled.

Optionally, the processor or the at least one external processor is configured to enable a given input device upon detecting at least one input event from the given input device.

Optionally, the at least one image renderer comprises a context image renderer and a focus image renderer, a display resolution of the focus image renderer being greater than a display resolution of the context image renderer, wherein the virtual desktop is rendered using the focus image renderer.

Optionally, in this regard, the at least one image renderer is a Fovea Contingent Image Renderer. The Fovea Contingent Image Renderer is designed to imitate a physiology of human vision. In particular, a given image to be rendered via the Fovea Contingent Image Renderer would be rendered at different display resolutions to provide a human eye-like viewing effect to the user. Such a Fovea Contingent Image Renderer allows for increasing immersion and realism within the immersive-reality environment.

Optionally, a remaining portion of a given view (that includes the virtual desktop) is rendered using the context image renderer. In such a case, the remaining portion appears less clear to the user as compared to the virtual desktop.

It will be appreciated that when the virtual desktop is rendered using the focus image renderer, the virtual desktop is readable by the user. Since the focus image renderer has the higher display resolution (as compared to the context image renderer), visual detail (for example, such as text, icons, image, and the like) of the virtual desktop is clearly perceivable to the user.

The user's input is indicative of the user's requirement/wish of switching the display apparatus from the first mode of operation to the second mode of operation. In particular, the processor or the at least one external processor processes the user's input to determine that the display apparatus is to be switched to the second mode of operation. In such a case, the switching of the display apparatus from the first mode of operation to the second mode of operation is semi-automatic (as the user's input initiates said switching). It will be appreciated that the user provides his/her input from switching the display apparatus to the second mode of operation via the at least one input device and/or the at least one tracking device (described hereinabove).

The at least one camera captures the at least one real-world image of the real-world environment. Optionally, the at least one camera is arranged on an outer surface of the display apparatus in a manner that the at least one real-world image depicts the real-world environment from a perspective of the user. It will be appreciated that the at least one camera repeatedly captures the at least one real-world image as long as the display apparatus is in use. The processor or the at least one external processor obtains the at least one real-world image from the at least one camera.

Throughout the present disclosure, the term "composite image" refers to an image that is composed of parts from two or more images. In particular, the at least one composite image is derived from the at least one next extended-reality image and the at least one real-world image. A given composite image has at least two portions: the first portion, the second portion.

The "first portion" of the at least one composite image is derived from the at least one next extended-reality image. Optionally, when deriving the first portion of the at least one composite image, the processor or the at least one external processor is configured to apply at least one image processing operation to the at least one next extended-reality image. Herein, the term "next extended-reality image" is used to refer to an extended-reality image that is supposed to be rendered immediately after the at least one extended-reality image. It will be appreciated that when the user provides the input to change the mode of operation of the display apparatus from the first mode of operation to the second mode of operation, the at least one next extended-reality image is not rendered as it is, but the at least one next extended-reality image is used to derive the at least one composite image. Then, the at least one composite image is rendered immediately after the at least one extended-reality image.

The "second portion" of the at least one composite image is derived from the at least one real-world image. The second portion of the at least one composite image, when rendered, provides the video see-through view of the real-world environment to the user. Optionally, when deriving the second portion of the at least one composite image, the processor or the at least one external processor is configured to apply at least one image processing operation to the at least one real-world image. Alternatively, optionally, when deriving the second portion of the at least one composite image, the processor or the at least one external processor is configured to use a portion of the at least one real-world image in the same form as it is captured by the at least one camera.

Optionally, the at least one image processing operation is at least one of: an image cropping operation, an image resizing operation, an image straightening operation, an image color-adjustment operation, an image sharpening operation, an image blurring operation. Such image processing operations are well-known in the art.

Optionally, the second portion of the at least one composite image lies below the first portion of the at least one composite image. In this case, the second part of the at least one composite image lies towards a lower part of the at least one composite image, whereas the first part of the at least one composite image lies towards an upper part of the at least one composite image.

In an embodiment, the first portion of the at least one composite image is a top half-portion of the at least one composite image, whereas the second portion of the at least one composite image is a bottom half-portion of the at least one composite image that lies below said top half-portion. One such example composite image has been illustrated in conjunction with FIG. 3C, for the sake of clarity.

In another embodiment, the second portion of the at least one composite image is a bottom revealing-window portion of the at least one composite image. In such a case, the second portion lies along at least a bottom edge of the at least one composite image. One such example composite image has been illustrated in conjunction with FIG. 5A, for the sake of clarity.

Alternatively, optionally, the second portion of the at least one composite image surrounds the first portion of the at least one composite image. In such a case, the second portion is a boundary portion of the at least one composite image, whereas the first portion is an interior portion of the at least one composite image. One such example composite image has been illustrated in conjunction with FIG. 5B, for the sake of clarity.

Yet alternatively, optionally, the second portion of the at least one composite image is surrounded by the first portion of the at least one composite image. In such a case, the second portion is arranged to fit into at least one digital cut-out region of the first portion. One such example composite image has been illustrated in conjunction with FIG. 5C, for the sake of clarity.

Still alternatively, optionally, the second portion of the at least one composite image lies beside the first portion of the at least one composite image. In an embodiment, the first portion of the at least one composite image is a left half-portion of the at least one composite image, whereas the second portion of the at least one composite image is a right half-portion of the at least one composite image. In another embodiment, the first portion of the at least one composite image is a right half-portion of the at least one composite image, whereas the second portion of the at least one composite image is a left half-portion of the at least one composite image.

It will be appreciated that the first and second portions of the at least one composite image may be arranged in various manners with respect to each other. Additionally, optionally, the at least one composite image comprises a third portion that is derived from an input image, wherein the input image is computer-generated and/or captured using an input camera.

As an example, a first portion of a given composite image is derived from a next extended-reality image depicting a given virtual-reality desktop view, and a second portion of the given composite image is derived from a given real-world image depicting a workstation of the user, wherein the workstation includes a laptop, a coffee mug, post-it notes on a pin-board, a pen and a writing pad. When the first portion is a top half-portion of the given composite image and the second portion is a bottom half-portion of the given composite image, the first portion of the given composite image depicts a top half-portion of the given virtual-reality desktop view and the second portion of the given composite image depicts a bottom half-portion of the given real-world image. The second portion of the given composite image may, for example, depict only the coffee mug, the pen, and a portion of the laptop (specifically, the QWERTY keyboard of the laptop).

Optionally, the processor or the at least one external processor is configured to:

analyze the at least one real-world image to recognize a plurality of real objects within the real-world environment;

assign a weight to a given real object, based on at least one of: an object category to which the given real object belongs, a proximity of the given real object to the user; and select at least one real object from amongst the plurality of real objects whose assigned weight is greater than a predefined threshold weight, wherein, when generating the at least one composite image, the processor or the at least one external processor is configured to crop a portion of the at least one real-world image that includes the at least one real object to derive the second portion of the at least one composite image.

In this regard, the processor or the at least one external processor utilizes image object labeling to generate the at least one composite image. Herein, the term "image object labeling" refers to an object recognition (namely, an object labeling) technique in which a given image depicting at least one object is analyzed to recognize the at least one object.

Optionally, when analyzing the at least one real-world image to recognize the plurality of real objects, a given real object is recognized based on at least one visual attribute of the given real object. Optionally, in this regard, the at least one visual attribute of the given real object is matched with predefined visual attributes of known real objects. It will be appreciated that the at least one visual attribute may, for example, be a shape, a size, a pattern (for example, such as a Quick Response code), a color, and the like, of the given real object.

Optionally, the processor or the at least one external processor is configured to determine, based on the at least one visual attribute of the given real object, the object category to which the given real object belongs, from among a plurality of object categories. The plurality of object categories may, for example, be 'input device', 'decorative item', 'food and drink', 'furniture', 'furnishing', 'marker', 'body part', and the like. In an example, a rectangular object having buttons may be determined to belong to the 'input device' category. In another example, a black-colored pattern printed on a retroreflective paper may be determined to belong to the 'marker' category. In yet another example, a coffee cup may be determined to belong to the 'food and drink' category.

Optionally, the processor or the at least one external processor is configured to determine, based on a depth map of a real-world environment, the proximity of the given real object to the user. In this regard, the depth map of the real-world environment is generated using a stereo camera, a plurality of cameras, the at least one camera and a depth camera, and the like. Herein, the term "depth map" refers to a data structure comprising information pertaining to optical depths of the plurality of real objects within the real-world environment from a device used to generate the depth map. Notably, the depth map can be used to determine optical depths of both the user and the given real object from the device used to generate the depth map, said optical depths being used to calculate the proximity of the given real object to the user.

Optionally, the processor or the at least one external processor employs a predefined weighting table for assigning the weight to the given object, wherein the predefined weighting table comprises at least one of: a plurality of object categories along with their corresponding sub-weights, a plurality of reference distances between the given real object and the user along with their corresponding sub-weights. In such a case, a sum total of sub-weight(s) associated with the given real object is assigned as the weight of the given real object. It will be appreciated that different object categories would be assigned different weights, based on an importance of objects belonging to an object category to be visible to the user whilst the user uses the display apparatus. As an example, the object category 'input device' may have a higher sub-weight as compared to the object category 'furnishing'. When two objects A1 and A2 having the object categories 'input device' and 'furnishing', respectively, lie at a same distance from the user, the object A1 would be assigned a higher weight as compared to the object A2.

Optionally, the at least one real object whose assigned weight is greater than the predefined threshold weight is cropped out of the at least one real-world image to be represented in the at least one composite image. The portion of the at least one real-world image that includes the at least one real object is cropped and used to derive the second portion of the at least one composite image in a manner that the at least one real object is visible in the at least one composite image. Optionally, a shape and/or a size of the portion of the at least one real-world image that includes the at least one real object is selected based on a shape and/or a size of the at least one real object. Moreover, optionally, the second portion of the at least one composite image is reshaped and/or resized according to the shape and/or the size of the at least one real object. This allows for depicting the at least one real object clearly in the second portion of the at least one composite image.

Optionally, the processor or the at least one external processor is configured to automatically switch a current mode of operation of the display apparatus to the second mode of operation when there is detected at least one real object whose assigned weight is greater than the predefined threshold weight.

Optionally, the processor or the at least one external processor is configured to automatically switch a current mode of operation of the display apparatus to the second mode of operation when the at least one real object whose assigned weight is greater than the predefined threshold weight belongs to at least one specific object category. Optionally, in this regard, the at least one specific object category is at least one of: 'input device', 'food and drink', 'marker'.

When the at least one composite image is rendered during the second mode of operation of the display apparatus, the user is presented with an immersive-reality view that includes a composite mix of the at least one next extended-reality image and the at least one real-world image. In other words, when the second mode of operation presents a combination of "extended-reality" and "actual reality" to the user. Moreover, the user is able to view a portion of the real-world environment along with a portion of an extended-reality environment whilst using the display apparatus, without removing the display apparatus from his/her head.

Optionally, the processor or the at least one external processor is configured to:
determine, based on a user's input, a third mode of operation to which the display apparatus is to be switched;
control the at least one camera to capture at least one other real-world image of the real-world environment; and
render, via the at least one image renderer, the at least one other real-world image during the third mode of operation of the display apparatus.

In this regard, during the third mode of operation, the user is shown a view of the real-world environment whereat he/she is positioned. Based on the user's input to switch the display apparatus to the third mode of operation, the at least one camera captures the at least one other real-world image from a perspective of the user (and in particular, the display apparatus). When the at least one other real-world image is rendered, the user is shown a view of the real-world environment from his/her perspective. Such a manner of operating the display apparatus in the third mode is extremely user-friendly as it allows the user to realistically view the real-world environment without taking off the display apparatus. In other words, the third mode of operation presents an "actual reality" environment to the user.

Optionally, the user selects the third mode of operation by providing a touch input of pressing a dedicated real-world view button on the display apparatus.

Optionally, the processor or the at least one external processor is configured to switch the display apparatus from a current mode of operation to a next mode of operation in a manner that said switching appears seamless to the user of the display apparatus. Optionally, in this regard, the processor or the at least one external processor implements at least one of: an animation effect, a fade effect, a transition effect.

The present disclosure also relates to the method as described above. Various embodiments and variants disclosed above apply mutatis mutandis to the method.

Optionally, the method further comprises:
analyzing the at least one real-world image to recognize a plurality of real objects within the real-world environment;
assigning a weight to a given real object, based on at least one of: an object category to which the given real object belongs, a proximity of the given real object to the user; and
selecting at least one real object from amongst the plurality of real objects whose assigned weight is greater than a predefined threshold weight,
wherein the step of generating the at least one composite image comprises cropping a portion of the at least one real-world image that includes the at least one real object to derive the second portion of the at least one composite image.

Optionally, in the method, the second portion of the at least one composite image lies below the first portion of the at least one composite image.

Optionally, the method further comprises:
selecting, based on a user's input, a given view from amongst a plurality of views available during the first mode of operation; and
generating, based on the selected given view, the at least one extended-reality image to be rendered.

Optionally, in the method, the plurality of views comprise at least two of:
a virtual-reality desktop view in which a virtual desktop is surrounded by a virtual environment,
a virtual-reality application view in which a virtual environment is created by a software application,
a virtual-reality overlay view in which the virtual desktop is overlaid on the virtual environment created by the software application,
a mixed-reality view in which at least one virtual object is overlaid on the real-world environment,
a mixed-reality overlay view in which the virtual desktop is overlaid on the mixed-reality view,
a settings overlay view in which a visual control panel is overlaid on any of: the virtual-reality desktop view, the virtual-reality application view, the virtual-reality overlay view, the mixed-reality view, or the mixed-reality overlay view.

Optionally, in the method, the virtual desktop is a virtual representation of a view that is being rendered contemporaneously at a display of an external computing device, wherein the external computing device is communicably coupled to the display apparatus, and wherein the software application is executed at the external computing device.

Optionally, in the method, the at least one image renderer comprises a context image renderer and a focus image renderer, a display resolution of the focus image renderer being greater than a display resolution of the context image renderer, wherein the method comprises rendering the virtual desktop using the focus image renderer.

Optionally, the method further comprises:
determining, based on a user's input, a third mode of operation to which the display apparatus is to be switched;
capturing, via the at least one camera, at least one other real-world image of the real-world environment; and
rendering, via the at least one image renderer, the at least one other real-world image during the third mode of operation of the display apparatus.

Optionally, the method further comprises obtaining the user's input as at least one of: a voice input, a touch input, a hand-gesture input, a head-gesture input, an eye-gesture input.

Optionally, the method further comprises enabling or disabling at least one interaction device, based on a current mode of operation of the display apparatus.

DETAILED DESCRIPTION OF THE DRAWINGS

Referring to FIG. 1, illustrated is a display apparatus 100 comprising at least one image renderer (depicted as an image renderer 102), at least one camera (depicted as a camera 104) and a processor 106. The processor 106 or at least one external processor (depicted as an external processor 108) communicably coupled to said processor 106 is configured to:
render, via the image renderer 102, at least one extended-reality image during a first mode of operation of the display apparatus 100;
determine, based on a user's input, a second mode of operation to which the display apparatus 100 is to be switched;
control the camera 104 to capture at least one real-world image of a real-world environment;
generate at least one composite image from at least one next extended-reality image and the at least one real-world image, wherein a first portion of the at least one composite image is derived from the at least one next extended-reality image, and a second portion of the at least one composite image is derived from the at least one real-world image; and
render, via the image renderer 102, the at least one composite image during the second mode of operation of the display apparatus 100.

Figure 2:
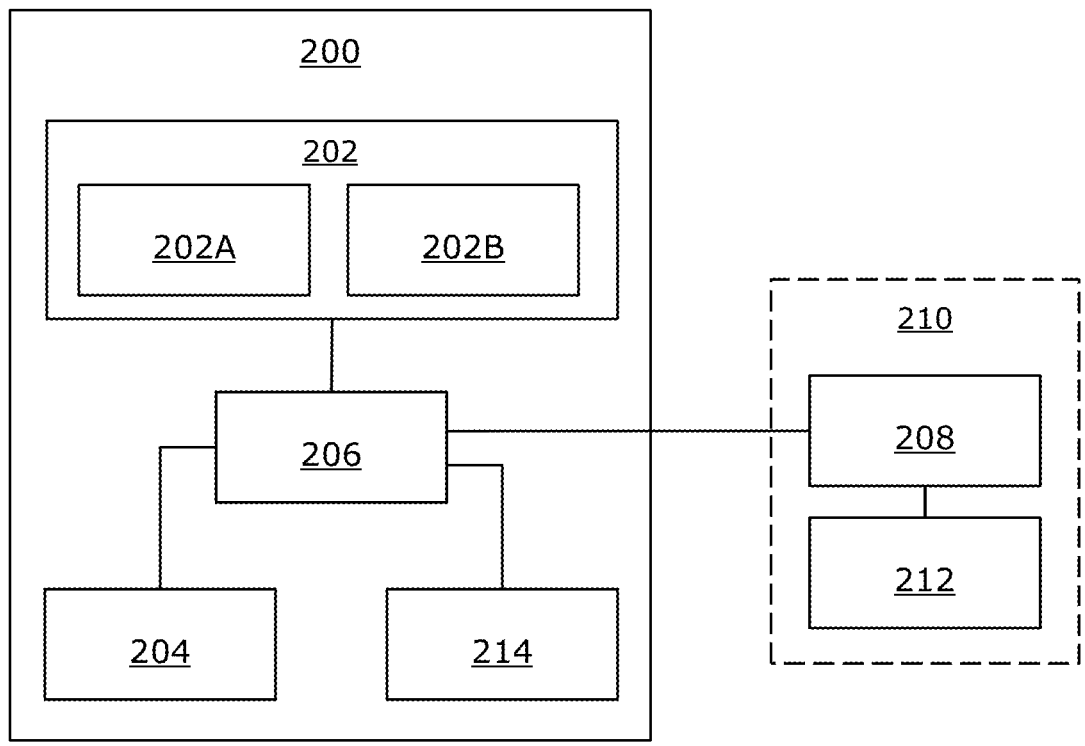

Referring to FIG. 2, illustrated is a display apparatus 200 comprising at least one image renderer (depicted as an image renderer 202), at least one camera (depicted as a camera 204) and a processor 206. The processor 206 is communicably coupled to at least one external processor (depicted as an external processor 208). An external computing device 210 comprises the external processor 208 and a display 212. The image renderer 202 comprises a context image renderer 202A and a focus image renderer 202B, a display resolution of the focus image renderer 202B being greater than a display resolution of the context image renderer 202A.

The display apparatus 200 further comprises at least one interaction device (depicted as an interaction device 214). The processor 206 is coupled in communication with the interaction device 214.

It may be understood by a person skilled in the art that FIG. 1 and FIG. 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure.

Figure 3A:
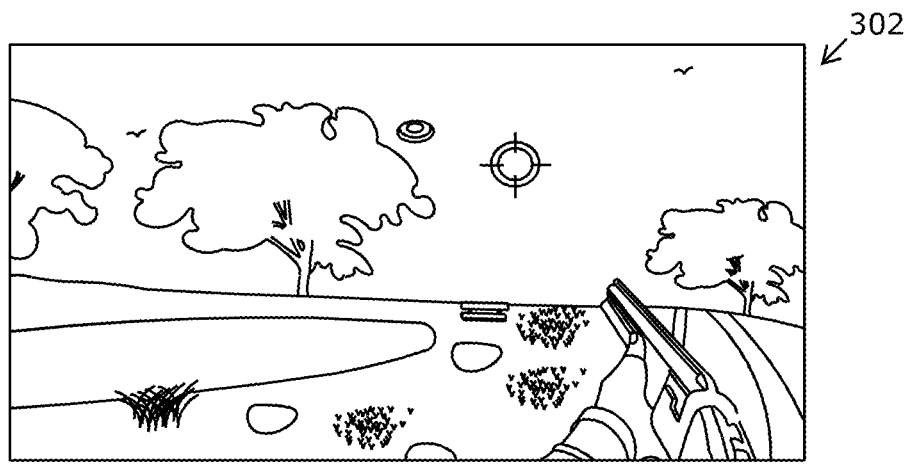
FIG. 3A illustrates an extended-reality image.
Figure 3B:
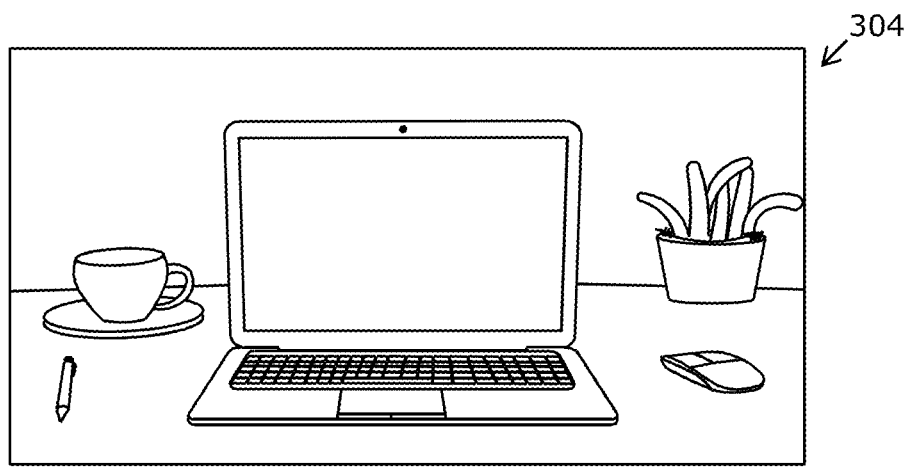
Figure 3C:
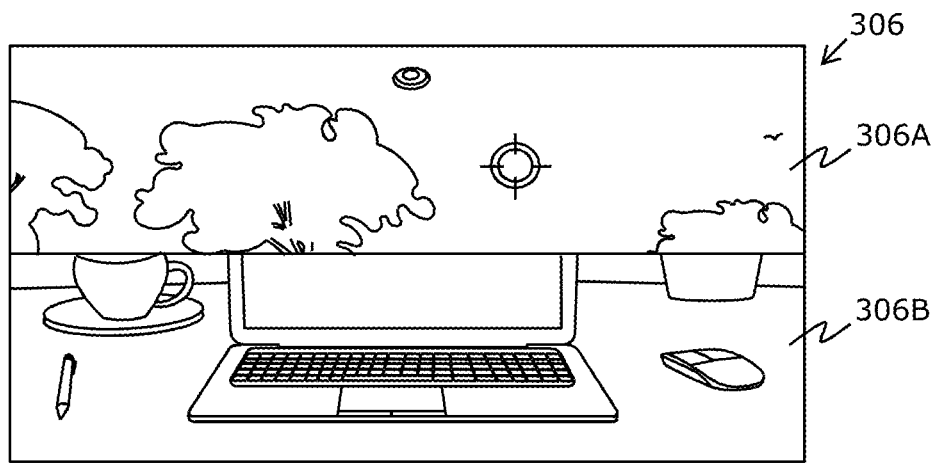
FIG. 3C illustrates a composite image, in accordance with an embodiment of the present disclosure.

Referring to FIGS. 3A-3C, FIG. 3A illustrates an extended-reality image 302, FIG. 3B illustrates a real-world image 304 of a real-world environment, while FIG. 3C illustrates a composite image 306, in accordance with an embodiment of the present disclosure.

In FIG. 3A, the extended-reality image 302 is a virtual-reality image of a virtual-reality shooting game. The extended-reality image 302 is rendered during a first mode of operation of a display apparatus. Moreover, the virtual-reality shooting game is shown to the user when a virtual-reality application view is selected by a user from amongst a plurality of views available during the first mode of operation.

In FIG. 3B, the real-world environment is an indoor real-world environment and the real-world image 304 depicts a plurality of real objects (notably, a pen, a coffee mug, a plant, a laptop computer, and a mouse) in the real-world environment. The real-world image 304 is captured using at least one camera of the display apparatus.

A next extended-reality image of the extended-reality image 302 and the real-world image 304 are used to generate the composite image 306. In FIG. 3C, a first portion 306A of the composite image 306 is derived from the next extended-reality image, and a second portion 306B of the composite image 306 is derived from the real-world image 304. As shown, the second portion 306B of the composite image 306 lies below the first portion 306A of the composite image 306.

It may be understood by a person skilled in the art that the FIGS. 3A, 3B and 3C are merely examples for sake of clarity, which should not unduly limit the scope of the claims herein. The person skilled in the art will recognize many variations, alternatives, and modifications of embodiments of the present disclosure.

Figure 4A:
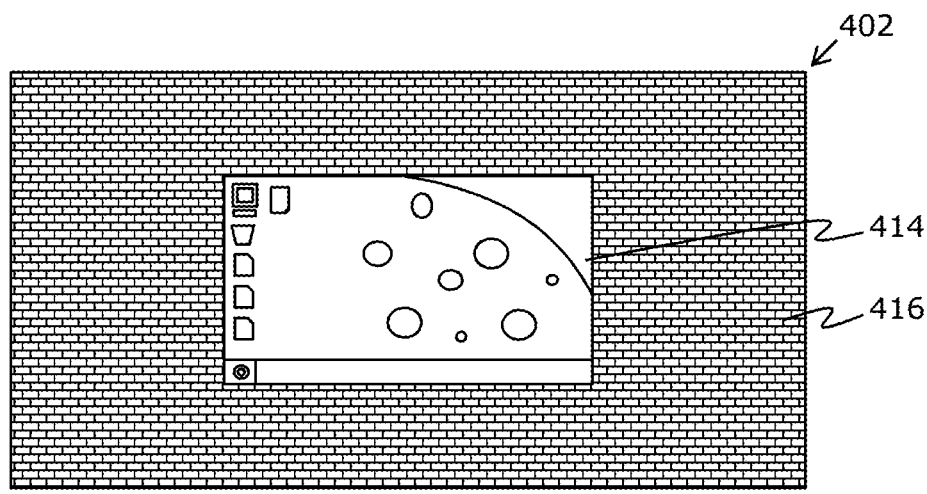
FIG. 4A illustrates a virtual-reality desktop view.
Figure 4B:
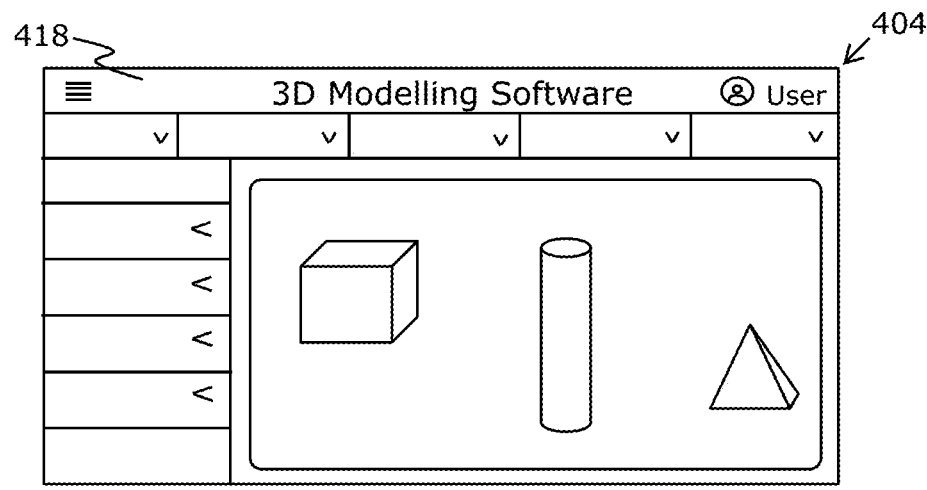
FIG. 4B illustrates a virtual-reality application view.
Figure 4C:
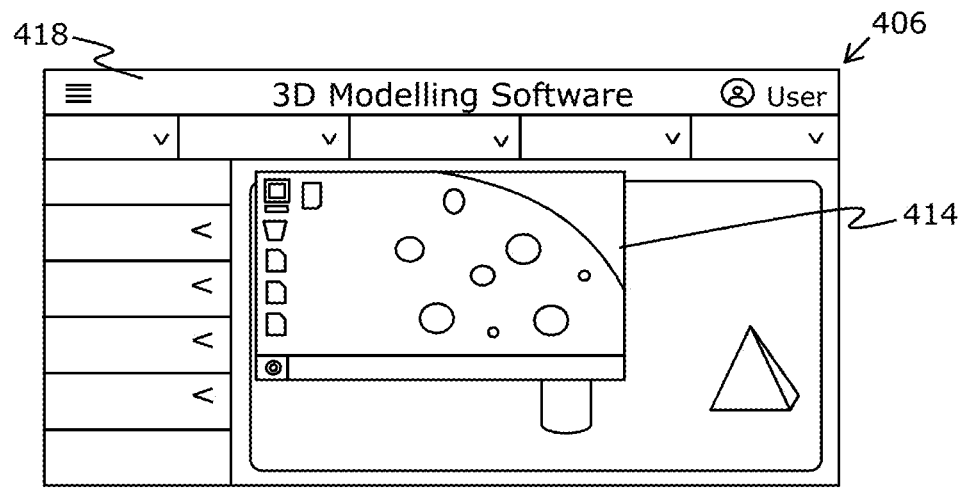
FIG. 4C illustrates a virtual-reality overlay view.
Figure 4D:
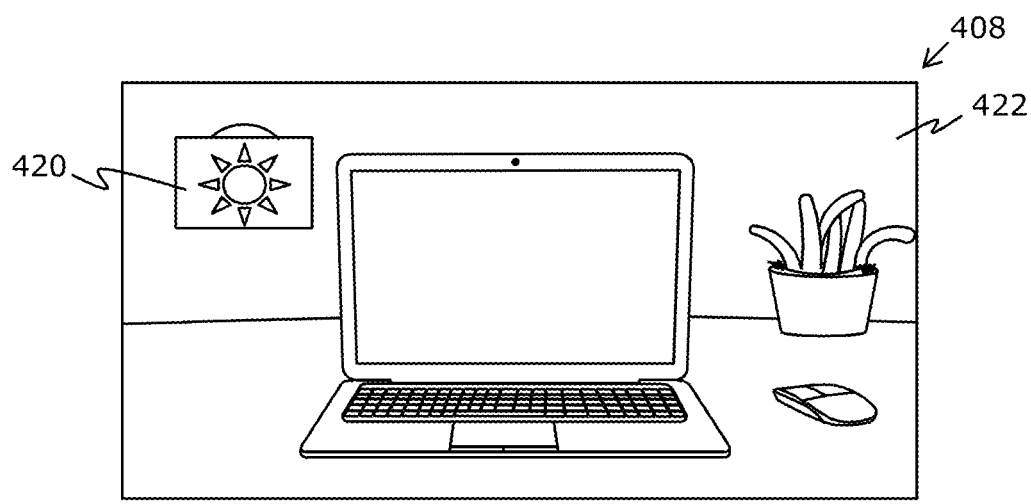
FIG. 4D illustrates a mixed-reality view.
Figure 4E:
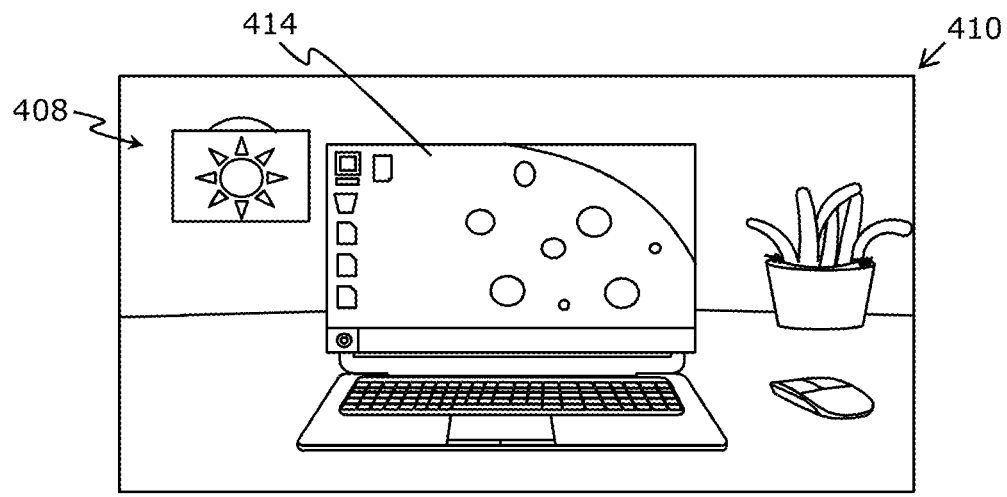
Figure 4F:
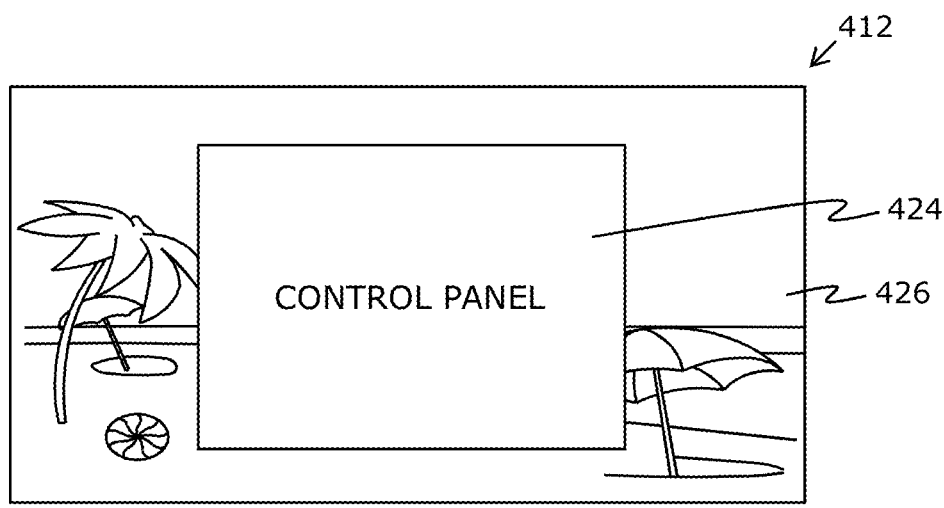
FIG. 4F illustrates a settings overlay view, in accordance with an embodiment of the present disclosure.

Referring to FIGS. 4A-4F, FIG. 4A illustrates a virtual-reality desktop view 402, FIG. 4B illustrates a virtual-reality application view 404, FIG. 4C illustrates a virtual-reality overlay view 406, FIG. 4D illustrates a mixed-reality view 408, FIG. 4E illustrates a mixed-reality overlay view 410, while FIG. 4F illustrates a settings overlay view 412, in accordance with an embodiment of the present disclosure.

In the virtual-reality desktop view 402 of FIG. 4A, a virtual desktop 414 is surrounded by a virtual environment 416. The virtual environment 416 that surrounds the virtual desktop 414 acts as a virtual background for the virtual desktop 414. The virtual desktop 414 is shown to be positioned in a central portion of the virtual-reality desktop view 402.

In the virtual-reality application view 404 of FIG. 4B, a virtual environment 418 is created by a software application. The exemplary virtual environment 418 represents a virtual interface of a three-dimensional modelling software.

In the virtual-reality overlay view 406 of FIG. 4C, the virtual desktop 414 is overlaid on the virtual environment 418 created by the software application. As a result, the user is shown the virtual desktop 414 and some portion of the virtual environment 418.

In the mixed-reality view 408 of FIG. 4D, at least one virtual object (depicted as a virtual painting 420) is overlaid on a real-world environment 422. The exemplary real-world environment 422 represents a workstation of a user.

In the mixed-reality overlay view 410 of FIG. 4E, the virtual desktop 414 is overlaid on the mixed-reality view 408.

In the settings overlay view 412 of FIG. 4F, a visual control panel 424 is overlaid on a virtual-reality application view 426 of a virtual-reality beach movie.

It may be understood by a person skilled in the art that FIGS. 4A-4F include simplified illustrations of a plurality of views 402, 404, 406, 408, 410 and 412 for sake of clarity, which should not unduly limit the scope of the claims herein. The person skilled in the art will recognize many variations, alternatives, and modifications of embodiments of the present disclosure.

Figure 5A:
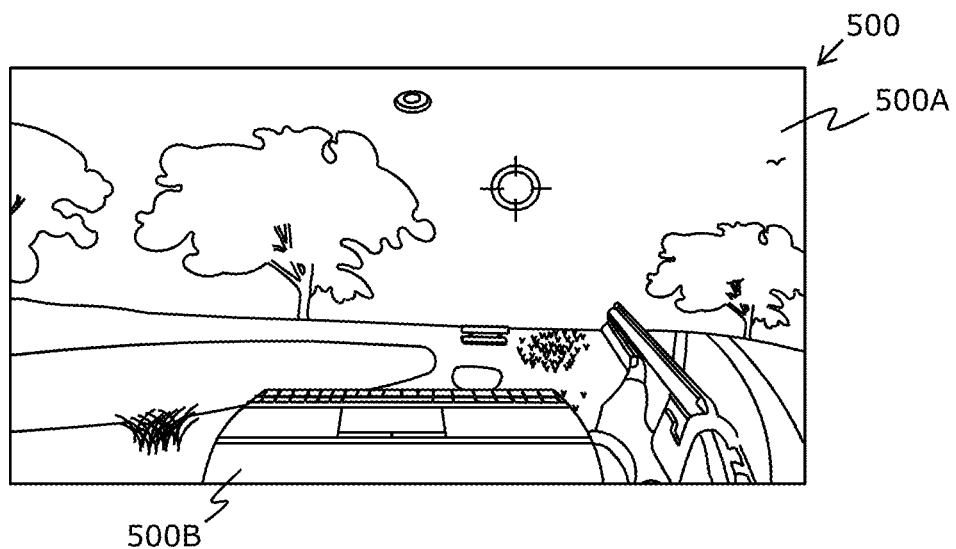
FIGS. 5A, 5B and 5C illustrate exemplary illustrations of various arrangements of a first portion and a second portion of a given composite image, in accordance with various embodiments of the present disclosure.
Figure 5B:
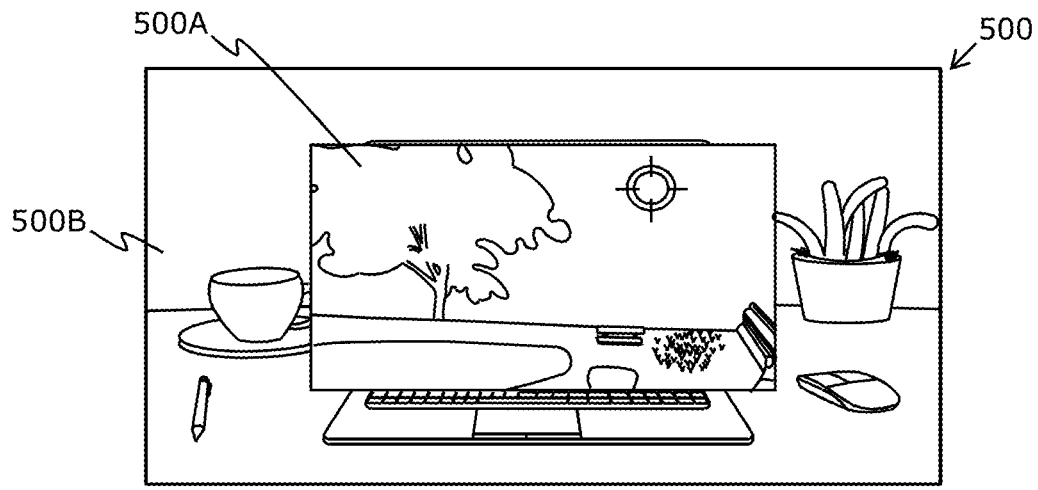
Figure 5C:
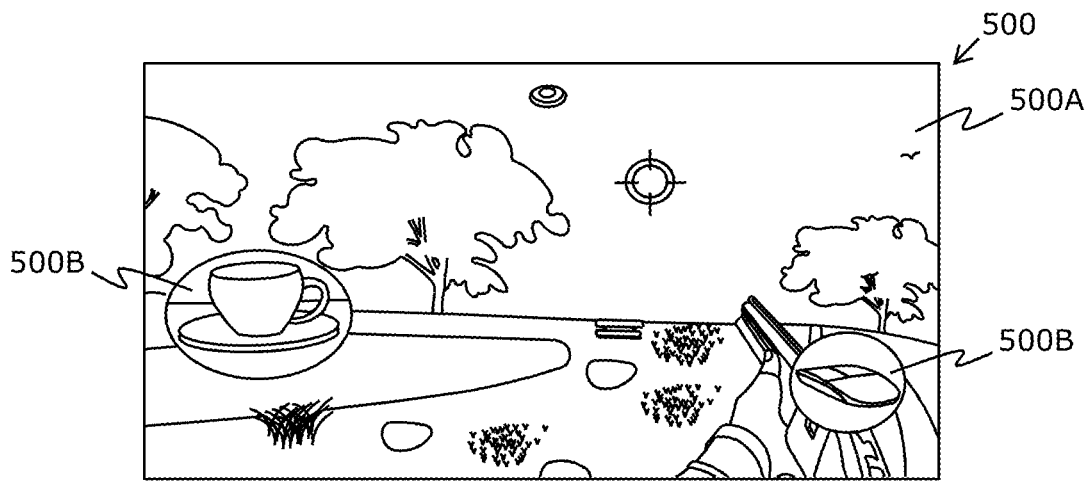

Referring to FIGS. 5A, 5B and 5C, illustrated are exemplary illustrations of various arrangements of a first portion 500A and a second portion 500B of a given composite image 500, in accordance with various embodiments of the present disclosure.

In FIG. 5A, the second portion 500B of the given composite image 500 lies below the first portion 500A of the given composite image 500. The second portion 500B of the given composite image 500 is a bottom revealing-window portion of the given composite image 500.

In FIG. 5B, the second portion 500B of the given composite image 500 surrounds the first portion 500A of the given composite image 500. As shown, the second portion 500B is a boundary portion of the given composite image 500, whereas the first portion 500A is an interior portion of the given composite image 500.

In FIG. 5C, the second portion 500B of the given composite image 500 is surrounded by the first portion 500A of the given composite image 500. In the given composite image 500, the second portion 500B is arranged to fit into two digital cut-out regions of the first portion 500A.

It may be understood by a person skilled in the art that FIGS. 5A, 5B and 5C include simplified exemplary arrangements of the first portion 500A and the second portion 500B of the given composite image 500 for sake of clarity, which should not unduly limit the scope of the claims herein. The person skilled in the art will recognize many variations, alternatives, and modifications of embodiments of the present disclosure.

Figure 6:
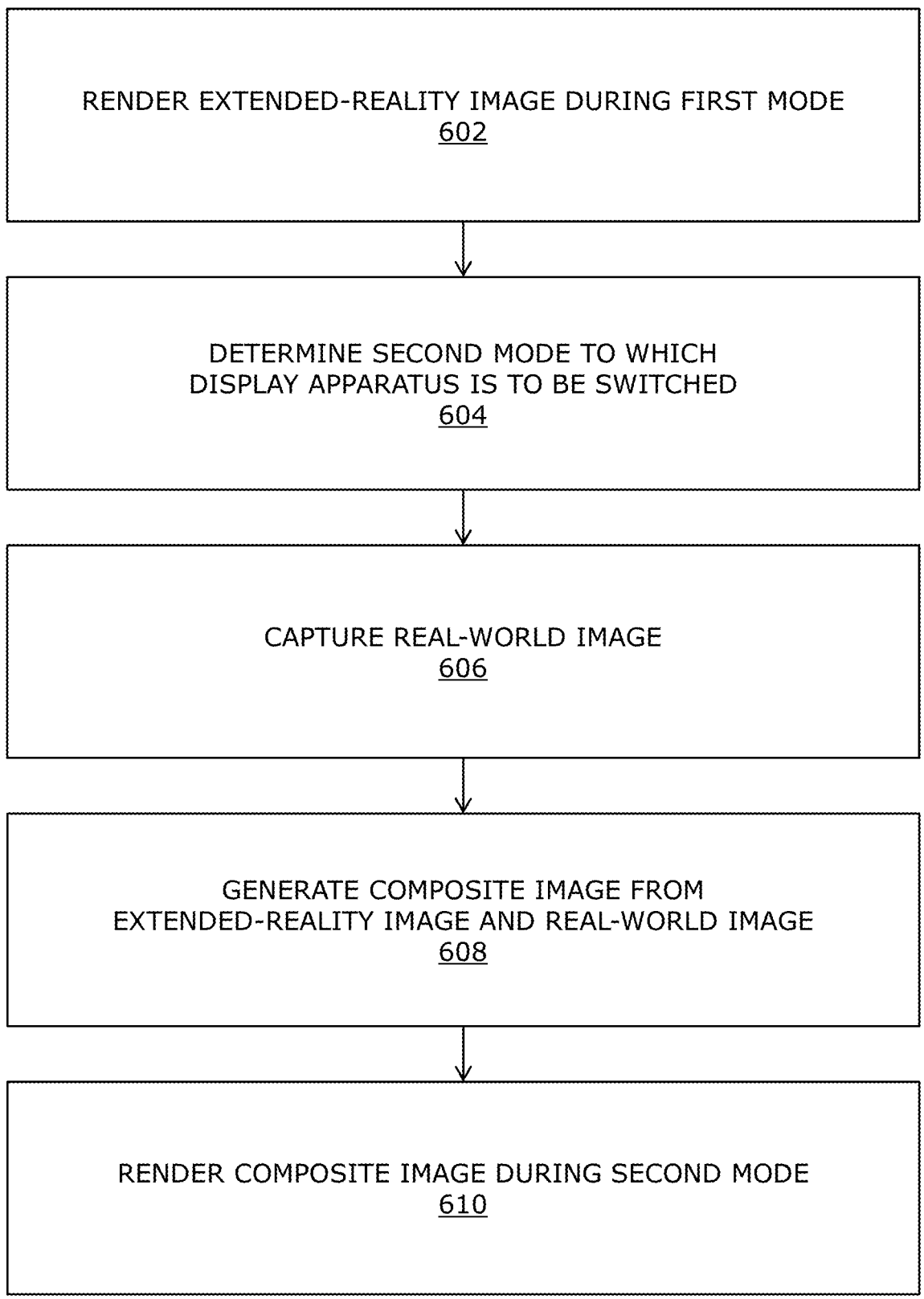
FIG. 6 illustrates steps of a method, in accordance with an embodiment of the present disclosure.

Referring to FIG. 6, illustrated are steps of a method, in accordance with an embodiment of the present disclosure. At step 602, at least one extended-reality image is rendered, via at least one image renderer, during a first mode of operation of a display apparatus. At step 604, a second mode of operation to which the display apparatus is to be switched is determined, based on a user's input. At step 606, at least one real-world image of a real-world environment is captured, via at least one camera. At step 608, at least one composite image is generated from at least one next extended-reality image and the at least one real-world image. A first portion of the at least one composite image is derived from the at least one next extended-reality image, and a second portion of the at least one composite image is derived from the at least one real-world image. At step 610, the at least one composite image is rendered, via the at least one image renderer, during the second mode of operation of the display apparatus.

The steps 602, 604, 606, 608 and 610 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising at least one image renderer, at least one camera and a processor, wherein the processor or at least one external processor communicably coupled to said processor is configured to, based on a user's input:
switch the display apparatus between two modes of operation:
render, via the at least one image renderer, at least one extended-reality image and at least one next extended-reality image, the at least one extended-reality image and the at least one next extended-reality image selected from among a plurality of views comprising a virtual reality image, an augmented reality image, and a mixed reality image; and
during a second mode of operation to which the display apparatus is to be switched:
control the at least one camera to capture at least one real-world image of a real-world environment;
generate at least one composite image from the at least one next extended-reality image and the at least one real-world image, wherein a first portion of the at least one composite image is derived from the at least one next extended-reality image, and a second portion of the at least one composite image is derived from the at least one real-world image; and
render, via the at least one image renderer, the at least one composite image during the second mode of operation of the display apparatus.

2. The display apparatus of claim 1, wherein the processor or the at least one external processor is configured to:
analyze the at least one real-world image to recognize a plurality of real objects within the real-world environment;
assign a weight to a given real object, based on at least one of: an object category to which the given real object belongs, a proximity of the given real object to the user; and
select at least one real object from amongst the plurality of real objects whose assigned weight is greater than a predefined threshold weight,
wherein, when generating the at least one composite image, the processor or the at least one external processor is configured to crop a portion of the at least one real-world image that includes the at least one real object to derive the second portion of the at least one composite image.

3. The display apparatus of claim 1, wherein the second portion of the at least one composite image lies below the first portion of the at least one composite image.

4. The display apparatus of claim 1, wherein the processor or the at least one external processor is configured to:
generate, based on the selected given view, the at least one extended-reality image to be rendered.

5. The display apparatus of claim 4, wherein the plurality of views comprise at least two of:
a virtual-reality desktop view in which a virtual desktop is surrounded by a virtual environment,
a virtual-reality application view in which a virtual environment is created by a software application,
a virtual-reality overlay view in which the virtual desktop is overlaid on the virtual environment created by the software application,
a mixed-reality view in which at least one virtual object is overlaid on the real-world environment,
a mixed-reality overlay view in which the virtual desktop is overlaid on the mixed-reality view,
a settings overlay view in which a visual control panel is overlaid on any of: the virtual-reality desktop view, the virtual-reality application view, the virtual-reality overlay view, the mixed-reality view, or the mixed-reality overlay view.

6. The display apparatus of claim 5, wherein the virtual desktop is a virtual representation of a view that is being rendered contemporaneously at a display of an external computing device, wherein the external computing device comprises the at least one external processor, and wherein the software application is executed by the at least one external processor.

7. The display apparatus of claim 5, wherein the at least one image renderer comprises a context image renderer and a focus image renderer, a display resolution of the focus image renderer being greater than a display resolution of the context image renderer, wherein the virtual desktop is rendered using the focus image renderer.

8. The display apparatus of claim 1, wherein the processor or the at least one external processor is configured to:
determine, based on the user's input, a third mode of operation to which the display apparatus is to be switched;
control the at least one camera to capture at least one other real-world image of the real-world environment; and
render, via the at least one image renderer, the at least one other real-world image during the third mode of operation of the display apparatus.

9. The display apparatus of claim 1, wherein the user's input is obtained as at least one of: a voice input, a touch input, a hand-gesture input, a head-gesture input, an eye-gesture input.

10. The display apparatus of claim 1, further comprising at least one interaction device, wherein the processor or the at least one external processor is configured to enable or disable the at least one interaction device based on a current mode of operation of the display apparatus.

11. A method comprising:
switching a display apparatus between two modes of operation:
wherein during a first mode of operation:
rendering, via at least one image renderer, at least one extended-reality image and at least one next extended-reality image, the at least one extended-reality image and the at least one next extended-reality image selected from among a plurality of views comprising a virtual reality image, an augmented reality image, and a mixed reality image;
during a second mode of operation to which the display apparatus is to be switched:
capturing, via at least one camera, at least one real-world image of a real-world environment;
generating at least one composite image from at least one next extended-reality image and the at least one real-world image, wherein a first portion of the at least one composite image is derived from the at least one next extended-reality image, and a second portion of the at least one composite image is derived from the at least one real-world image; and
rendering, via the at least one image renderer, the at least one composite image during the second mode of operation of the display apparatus.

12. The method of claim 11, further comprising:

analyzing the at least one real-world image to recognize a plurality of real objects within the real-world environment;

assigning a weight to a given real object, based on at least one of: an object category to which the given real object belongs, a proximity of the given real object to the user; and selecting at least one real object from amongst the plurality of real objects whose assigned weight is greater than a predefined threshold weight, wherein the step of generating the at least one composite image comprises cropping a portion of the at least one real-world image that includes the at least one real object to derive the second portion of the at least one composite image.

13. The method of claim 11, wherein the second portion of the at least one composite image lies below the first portion of the at least one composite image.

14. The method of claim 11, further comprising:

generating, based on the selected given view, the at least one extended-reality image to be rendered.

15. The method of claim 14, wherein the plurality of views comprise at least two of:

a virtual-reality desktop view in which a virtual desktop is surrounded by a virtual environment, a virtual-reality application view in which a virtual environment is created by a software application, a virtual-reality overlay view in which the virtual desktop is overlaid on the virtual environment created by the software application, a mixed-reality view in which at least one virtual object is overlaid on the real-world environment, a mixed-reality overlay view in which the virtual desktop is overlaid on the mixed-reality view, a settings overlay view in which a visual control panel is overlaid on any of: the virtual-reality desktop view, the virtual-reality application view, the virtual-reality overlay view, the mixed-reality view, or the mixed-reality overlay view.

16. The method of claim 15, wherein the virtual desktop is a virtual representation of a view that is being rendered contemporaneously at a display of an external computing device, wherein the external computing device is communicably coupled to the display apparatus, and wherein the software application is executed at the external computing device.

17. The method of claim 15, wherein the at least one image renderer comprises a context image renderer and a focus image renderer, a display resolution of the focus image renderer being greater than a display resolution of the context image renderer, wherein the method comprises rendering the virtual desktop using the focus image renderer.

18. The method of claim 11, further comprising:

determining, based on the user's input, a third mode of operation to which the display apparatus is to be switched;

capturing, via the at least one camera, at least one other real-world image of the real-world environment; and rendering, via the at least one image renderer, the at least one other real-world image during the third mode of operation of the display apparatus.

19. The method of claim 11, further comprising obtaining the user's input as at least one of: a voice input, a touch input, a hand-gesture input, a head-gesture input, an eye-gesture input.

20. The method of claim 11, further comprising enabling or disabling at least one interaction device, based on a current mode of operation of the display apparatus.

* * * * *

UNITED STATES PATENT AND TRADEMARK OFFICE
CERTIFICATE OF CORRECTION

PATENT NO. : 11,049,306 B2  
APPLICATION NO. : 16/675447  
DATED : June 29, 2021  
INVENTOR(S) : Akseli Anttila et al.

Page 1 of 1

It is certified that error appears in the above-identified patent and that said Letters Patent is hereby corrected as shown below:

On the Title Page

Change item (73) Assignee: "Vago Technologies Oy, Helsinki (FI)" to --Varjo Technologies Oy, Helsinki (FI)--

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*